(12) United States Patent
Malpani et al.

(10) Patent No.: US 12,474,827 B2
(45) Date of Patent: Nov. 18, 2025

(54) MEDIA INPUT CONTROL SETTINGS

(71) Applicant: GOOGLE LLC, Mountain View, CA (US)

(72) Inventors: Megha Malpani, San Francisco, CA (US); Ryosuke Matsumoto, Dublin, CA (US); Guoxing Zhao, South Hurstville (AU); Jonathon Leigh Napper, Pymble (AU); Megan L. Fu, San Francisco, CA (US); Nikhil Siva Subash, San Jose, CA (US); Gary Hyun Jin Kim, San Mateo, CA (US); Alex Newcomer, San Francisco, CA (US); Joseph Kurachi Luk, Hokkaido (JP)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/343,271

(22) Filed: Jun. 28, 2023

(65) Prior Publication Data
US 2025/0004628 A1 Jan. 2, 2025

(51) Int. Cl.
*G06F 3/048* (2013.01)
*G06F 3/04847* (2022.01)

(52) U.S. Cl.
CPC .............................. *G06F 3/04847* (2013.01)

(58) Field of Classification Search
None
See application file for complete search history.

(56) References Cited

U.S. PATENT DOCUMENTS

| | | | | |
|---|---|---|---|---|
| 9,426,203 | B2* | 8/2016 | Heeter | H04M 1/72415 |
| 9,891,803 | B2* | 2/2018 | Scott | G06F 16/9577 |
| 2006/0123353 | A1* | 6/2006 | Matthews | G06F 3/0481 |
| | | | | 715/779 |
| 2007/0244586 | A1* | 10/2007 | Champion | G06F 3/165 |
| | | | | 370/252 |
| 2020/0225837 | A1* | 7/2020 | Francioso | H04L 65/612 |
| 2021/0258427 | A1* | 8/2021 | Lee | H04L 12/1831 |
| 2022/0030302 | A1* | 1/2022 | Chavan | H04L 65/1083 |
| 2022/0256063 | A1* | 8/2022 | Chen | H04N 23/60 |
| 2023/0289127 | A1* | 9/2023 | Gupta | G06F 3/04817 |

OTHER PUBLICATIONS

Brangers, "Google is Working On Built-In Video Conferencing Controls for Chromebooks", Chrome Unboxed, Nov. 13, 2022, 5 pages.

* cited by examiner

*Primary Examiner* — Thanh T Vu
(74) *Attorney, Agent, or Firm* — Brake Hughes Bellermann LLP (57) ABSTRACT

A method may determine that an application with access to a media input resource has been launched by a user. A method may in response to determining that the application is launched, initiate a display of a settings user interface including a control for modifying a media input resource setting accessible via the operating system. A method may control transmission of a media output to the application based on the media input resource setting.

22 Claims, 10 Drawing Sheets

MEDIA INPUT CONTROL SETTINGS

TECHNICAL FIELD

This description relates to control settings for a media input resource, such as camera and/or a microphone used by one or more applications.

BACKGROUND

Settings for media input resources, such as microphones and cameras internal or external to computing devices, allow users to modify one or more outputs from those microphones or cameras within application software, such as a videoconferencing application.

SUMMARY

Disclosed implementations provide centralized control of the settings for a camera and/or microphone by an operating system. Implementations utilize a pop-up user interface that surfaces in response an application seeking access to the camera and/or microphone to provide controls for one or more camera and/or microphone settings at an operating system level. Controlling the media input resource settings at the operating system level enables the computing device to apply effects globally. For example, implementations can apply modifications, such as background blur, noise cancellation, etc. even if the application accessing the media input resource does not support such effects. Additionally, controlling the media input resource at the operating system level enables the user interface to offer a novel return-to-application control. The return-to-application control lists all executing applications with access to the controlled media input resources, e.g., the microphone and/or camera. In response to the user selecting one of the listed applications, the operating system can give focus to the desired application. Giving focus to an application brings the application to the front and makes it the active/current window. The return-to-application control streamlines interactions between the user and the computer and helps the user return immediately to the user interface of the application accessing the camera.

DETAILED DESCRIPTION

Settings for media input resources, for example a microphone and/or a camera, allow users to select one or more modifications to be made to the media output of the media input resource. The media output includes the raw sound, image, and/or video frames. In prior methods, media input resource settings are used within application software itself. For example, settings for blurring a background are currently found within individual videoconferencing applications. The settings may include any combination of the following non-inclusive list: on/off output settings, image filters, background blurs, framing controls, lighting adjustments, sound cancellation, sound filters, sound volume, closed captioning, etc. Disclosed implementations enable the operating system to modify the settings and to control the transmission of media output in accordance with the settings.

Figure 1A:
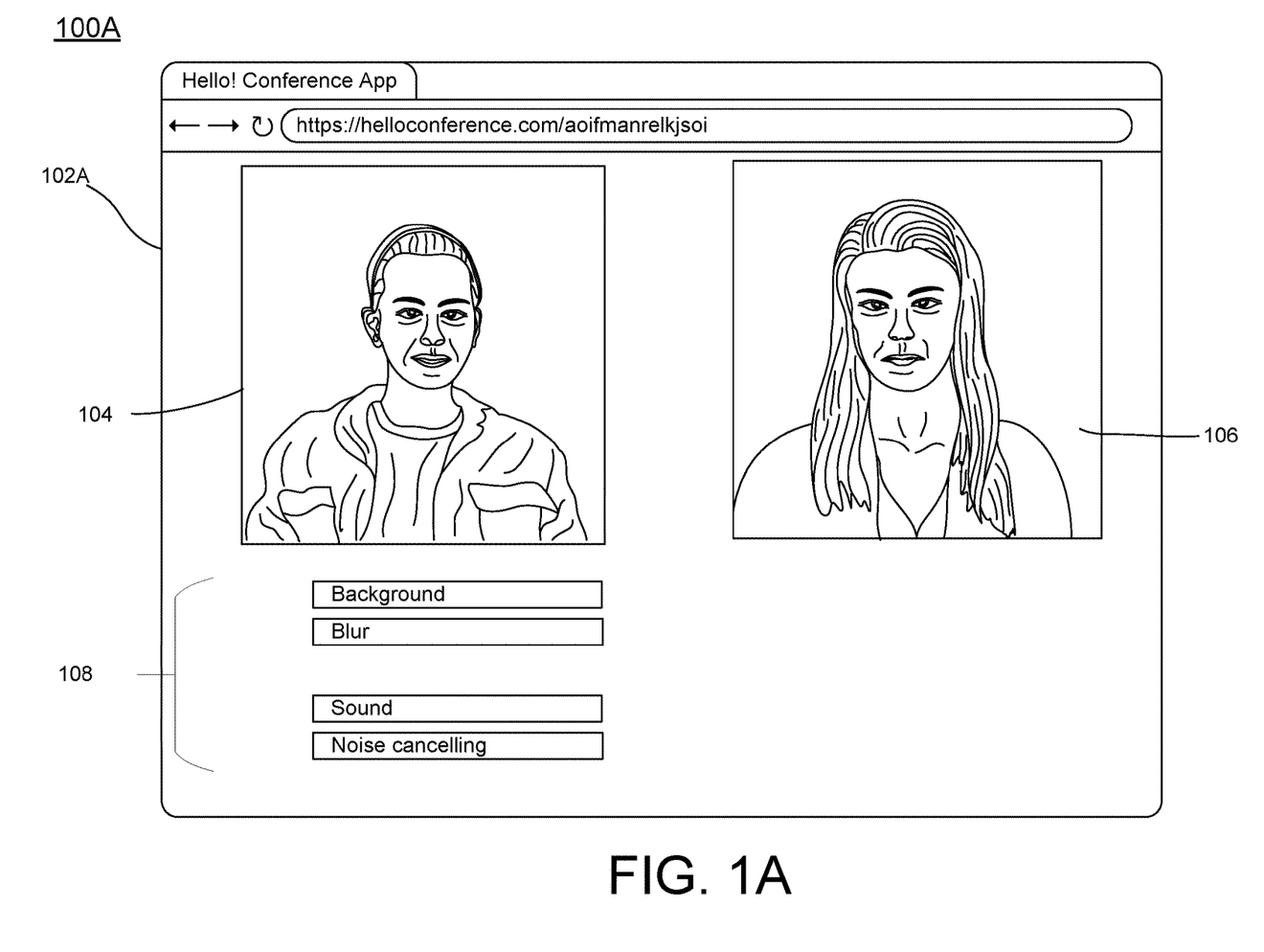
FIG. 1A depicts a scenario, in accordance with an example.

FIG. 1A depicts scenario 100A. Scenario 100A is a screenshot of an application user interface 102A. Application user interface 102A is videoconferencing software that executes in a browser window but is representative of any application capable of being executed by an operating system. In scenario 100A, application user interface 102A is a client application for a first user 104, who is speaking to a second user 106. Application user interface 102A includes media input resource setting controls 108, which may be used to modify the sound, images, and/or frames received from a camera and/or microphone accessed by application user interface 102A. The modified sound, image, and/or frames may be displayed by application user interface 102A and/or sent to a remote client application associated with a user device used by second user 106.

Settings for media input resources are currently only accessible from within application software, which forces the user to navigate to and change those settings within multiple applications. For example, a user that wants their background blurred during a video call must find the blur setting in multiple video call applications manually. Navigating to find the setting in each application can be frustrating and create friction for the user.

The present disclosure describes a method to place the settings for media input resources in the operating system kernel for one or more applications in a uniform and consistent way. The operating system kernel may then apply the modifications designated by the setting to generate a modified media output. The modified media output may be received by all applications receiving an output from the media input resource. Thus, any of the one or more applications, when executed and used by the user, will receive the modified media output, generated according to the setting in the operating system, and output the modified media output by interface of the application. The settings are, thereby, placed in a uniform way for the plurality of applications via the operating system. The search for corresponding settings in each one of the plurality of applications is no longer required.

The disclosure further describes a settings user interface that allows a user, via the operating system, to modify a setting for a media output via one or more controls. The appearance of the settings user interface may be triggered by a variety of events. For example, the settings user interface may be triggered upon determining that an application with access to a media input resource has been launched by a user, when a user has initiated a functionality with the application (i.e., a teleconference call) that initiates a use of a media output resource, and/or when a user returns focus to an application using the media output resource (i.e., when the user re-activates a window of the application during an ongoing teleconference call). The settings user interface is an interface of the operating system. When the user uses the settings user interface and, particularly, when the user modifies settings for a media output, the modified settings apply to each of the one or more applications. I.e. each of the one or more applications will output media output modified according to settings done via the settings user interface of the operating system. In this way, only one interface is used by the user to modify media output that may be output by any one of the plurality of applications. The user does not need to set respective settings via different application interfaces, which is cumbersome and time consuming. At the same time the user may still be able to use an application interface for making corresponding settings for the respective application individually. This may improve media output management for different applications with interfaces allowing media output.

In examples, the settings user interface may further provide a control for a user to return directly to an application that is accessing the media input resource directly from the settings user interface.

Figure 1B:
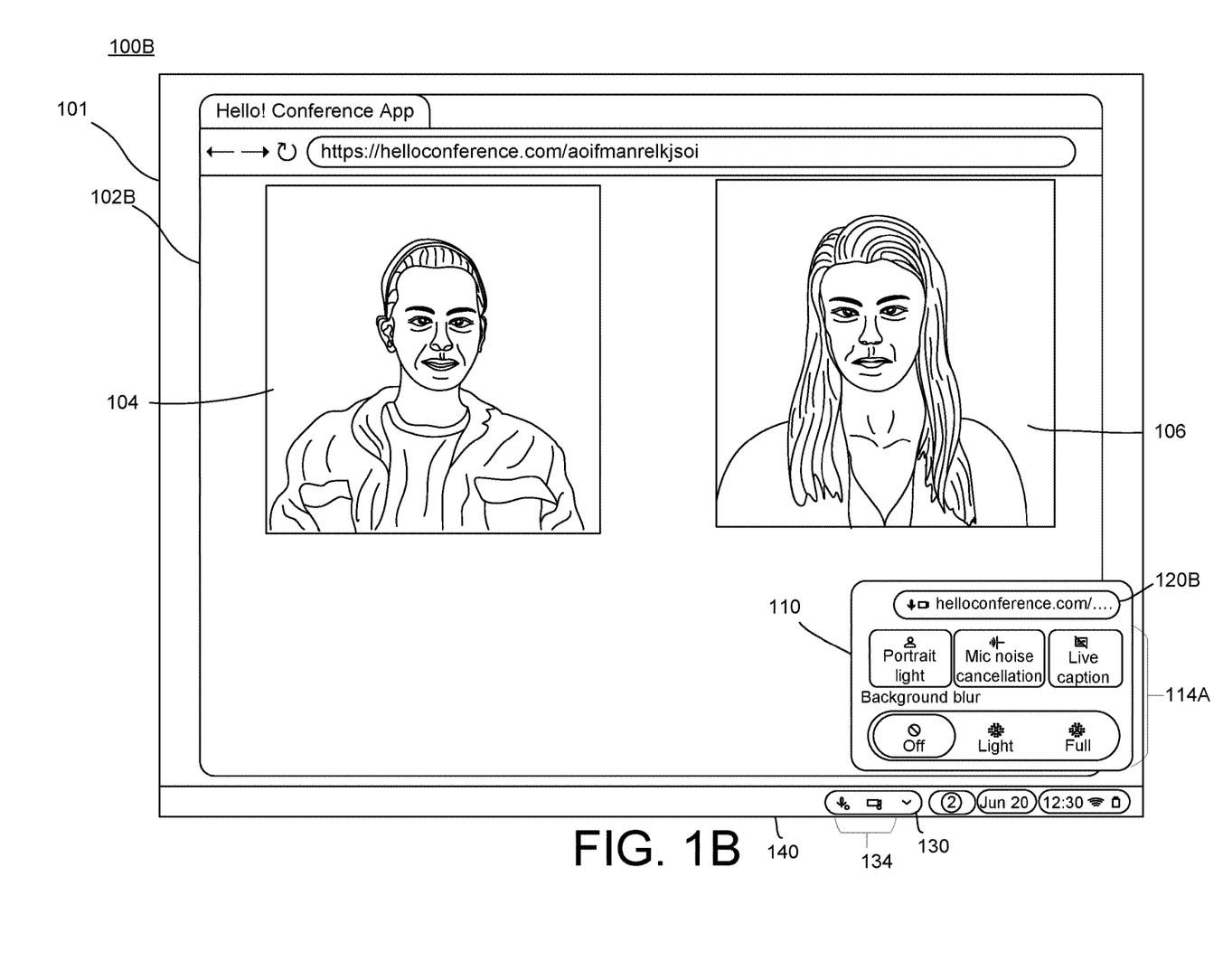
FIG. 1B depicts a scenario, in accordance with an example.

FIG. 1B depicts scenario 100B, in accordance with an example. Scenario 100B depicts a desktop 101 of a user device associated with first user 104. Example application user interface 102B is executing, which includes concurrent displays of first user 104 and second user 106.

In scenario 100B, the operating system displays media input settings user interface 110 and/or media input settings user interface 130. Media input settings user interface 110, floats over the desktop including controls 114A for one or more media input resource settings. Media input settings user interface 130 is visible in a desktop task bar and includes controls 134 for one or more media input resource settings.

In examples, media input settings user interface 110 may further include a return-to-application control 120B, as will be further described below.

Application user interface 102B is depicted without the media input resource setting controls 108 that were present in application user interface 102A. In examples, however, application user interface 102B may also include its own set of media input resource setting controls.

Figure 2A:
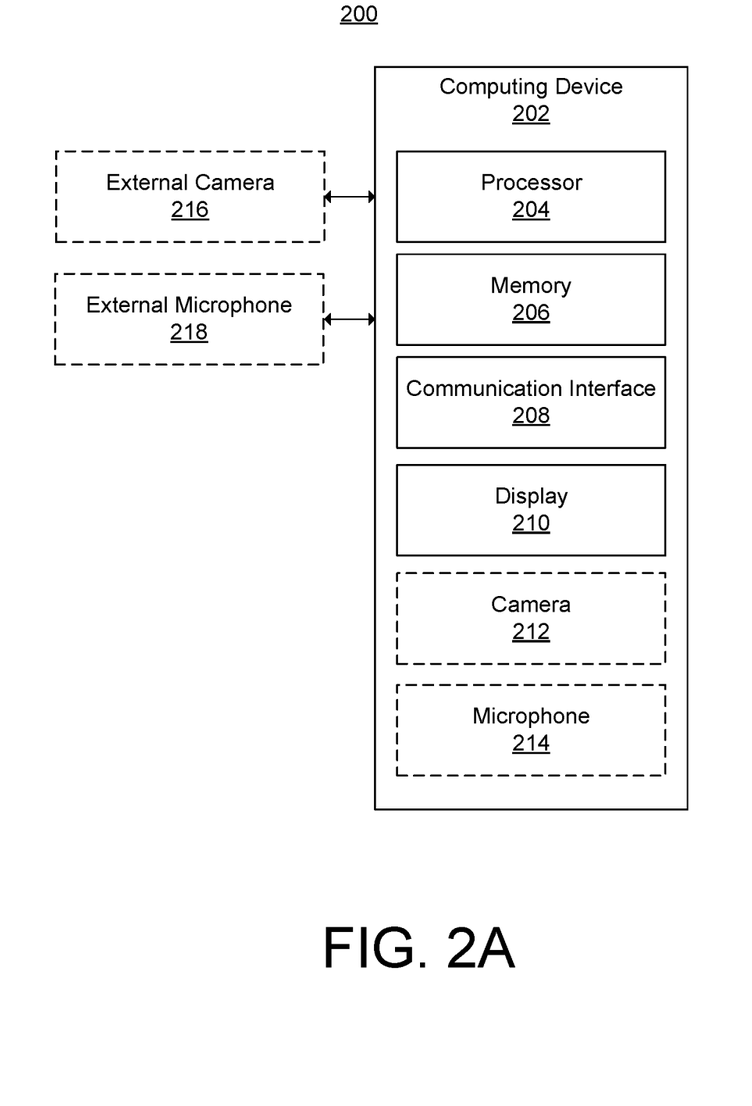
FIG. 2A depicts a block diagram of a computing device, in accordance with an example.

FIG. 2A depicts system 200, in accordance with an example. System 200 may be used to allow a user to configure the settings for a media input resource being accessed by an application.

System 200 includes a computing device 202. In examples, computing device 202 may be a smart phone, a hand-held device, a laptop, a desktop computer, or any other computing device that a user may use to execute an application that accesses a media input resource.

Computing device 202 includes a processor 204, a memory 206, a communication interface 208, and a display 210. In examples, computing device 202 may further include a camera 212 and/or a microphone 214.

In examples, processor 204 may include multiple processors, and memory 206 may include multiple memories. Processor 204 may be in communication with any cameras, sensors, and other modules and electronics of computing device 202. Processor 204 is configured by instructions (e.g., software, application, modules, etc.) to execute an application that accesses media input resources. The instructions may include non-transitory computer readable instructions stored in, and recalled from, memory 206. In examples, the instructions may be communicated to processor 204 from a computing device, for example a server.

Processor 204 of computing device 202 is in communication with display 210. Processor 204 may be configured by instructions to configure a browser to generate an in-browser camera list including a virtual camera. Processor 204 may be further configured by instructions to use the virtual camera to generate modified frames based on physical camera frames.

Communication interface 208 of computing device 202 may be operable to facilitate communication between computing device 202, peripheral devices paired to computing device 202, or other user computing devices. In examples, communication interface 208 may utilize Bluetooth, Wi-Fi, Zigbee™, or any other wireless or wired communication methods.

Display 210 may be used to display the physical camera frames received from a physical camera and/or the modified frames received from the virtual camera. In examples, display 210 may be a smartphone display, a hand-held computing device display, a laptop display, or an external monitor.

Camera 212 is a physical camera with a lens, aperture, and detector. In examples, camera 212 may include an internal microphone. Alternatively, physical camera frames generated with camera 212 may be combined with audio from microphone 214 to generate a media input feed.

Microphone 214 is a physical microphone with a diaphragm, a metal coil, and a magnet assembly.

In examples, computing device 202 may be coupled to one or more external media input resources. For example, computing device 202 may include one or more instances of external camera 216 and external microphone 218. In examples, external camera 216 and external microphone 218 may include similar features to camera 212 and microphone 214.

Figure 2B:
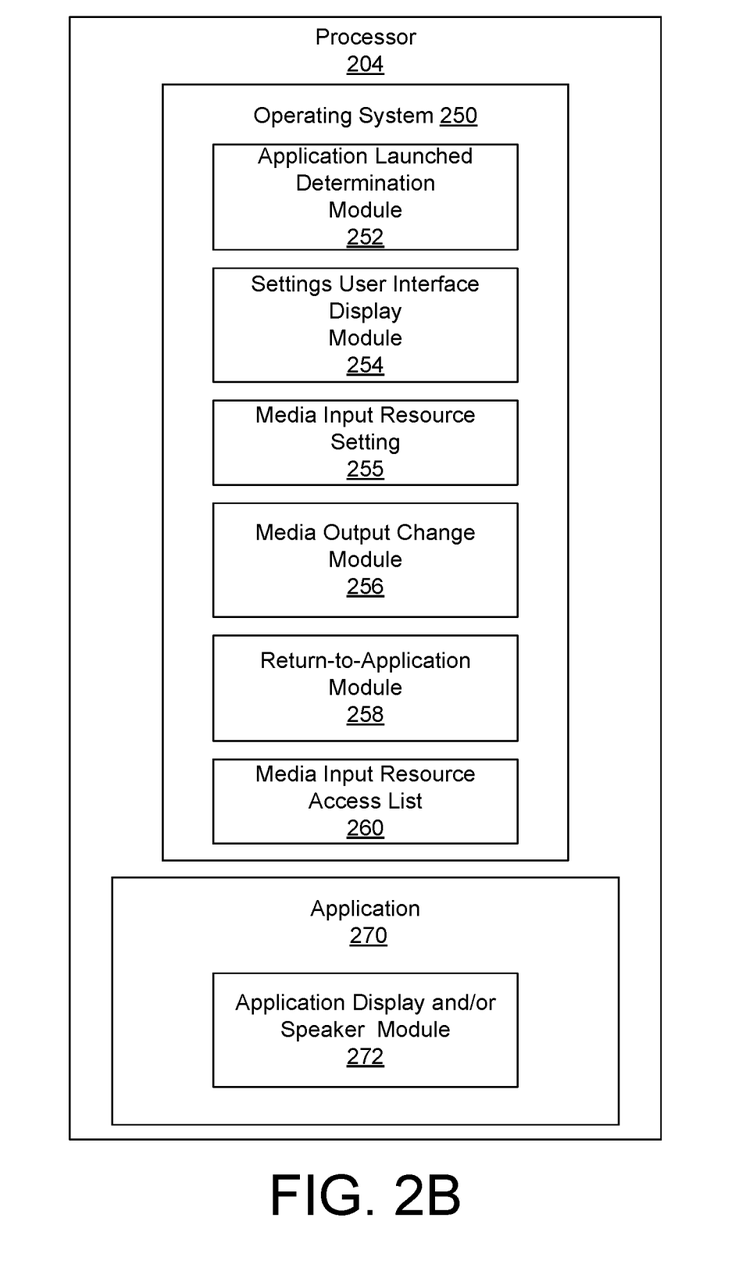
FIG. 2B depicts a block diagram of a processor, in accordance with an example.

FIG. 2B depicts a runtime view of processor 204, in accordance with an example. In FIG. 2B, it may be seen that an operating system 250 executes on processor 204. Operating system 250 is the computer program at the core of the operating system, or the operating system kernel, executing on processor 204, facilitating interactions between hardware and software components of computing device 202. In examples, operating system 250 may control hardware resources via device drivers, manage processes, and optimize utilization of common resources.

In examples, processor 204 may be further configured to execute one or more application programs, including application 270. In examples, application 270 may execute in a separate portion of memory from operating system 250.

In examples, application 270 may be an executable computer program designed to carry out one or more tasks that access one or more resources from the operating system media input resource list. Application 270 may provide video or phone conferencing functionality, photobooth functionality, sound booth functionality, and so forth.

In examples, operating system 250 supports a multitasking environment. Application 270 is associated with a process running on operating system 250.

In examples, application 270 may comprise a browser application. In examples, the browser application may execute in one or more multiple runtime instances via one or more tabs. In examples, the one or more tabs may execute as separate processes on operating system 250.

Application 270 may include any combination of: video conferencing software, messaging software, a video, image, or audio editing software. In other examples, application 270 may comprise audio conferencing or audio editing software.

In examples, application 270 may execute video conferencing module 272. Video conferencing module 272 may be operable to allow a user to communicate with other users using one or more of camera 212, microphone 214, external camera 216, and/or external microphone 218.

Operating system 250 may include application launched determination module 252. Application launched determination module 252 may be executed, by operating system 250, to determine that application 270 has been launched by a user. Application 270 has access to the media input resource, which includes at least one of a microphone and a camera. The media input resource may comprise any combination of camera 212, microphone 214, external camera 216, and external microphone 218.

In examples, operating system 250 may be a multitasking operating system. In examples, application 270 may be videoconferencing software executing in a process. The videoconferencing software application may request access to the media input resource via operating system 250. Application launched determination module 252 may determine that application 270 has accessed a media input resource by monitoring a process associated with application 270. The metadata associated with the process may be evaluated to determine that application 270 has accessed a media input resource. In examples, the metadata associated with the process may include an application process identifier and a media input type.

Operating system 250 may further include a settings user interface display module 254 and a media input resource setting 255. Settings user interface display module 254 may initiate a display of a settings user interface including a control for modifying media input resource setting 255 via the operating system.

Media input resource setting 255 may be used to modify an output of a media input resource sent to application 270. In examples, the media input resource setting may include any combination of: a mute/unmute control, a display on/off control, a noise cancellation control, a background blur control, a light control, a live captioning control (which provides a display of a text interpretation of speech), or any other controls that may specify how an output form a media input resource may be modified.

Figure 1C:
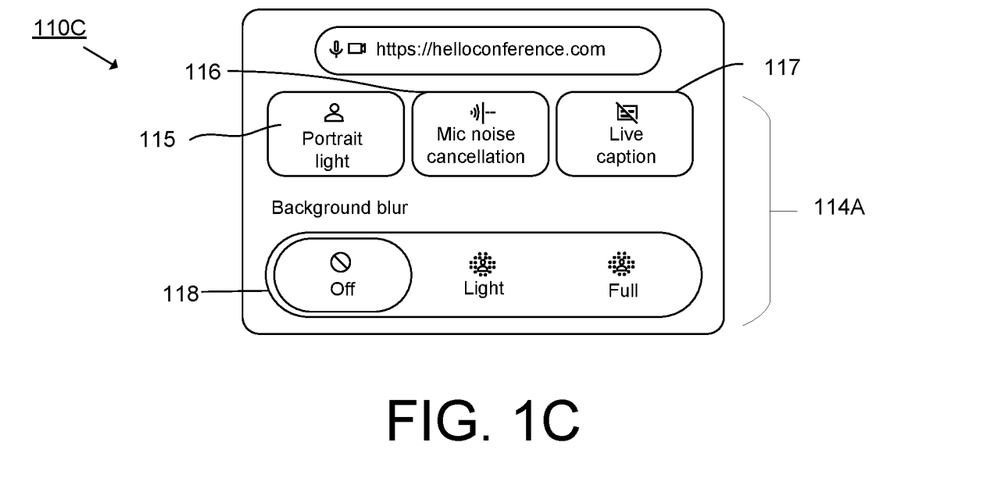
FIG. 1C depicts a media input settings user interface 110, according to an example.
Figure 1D:
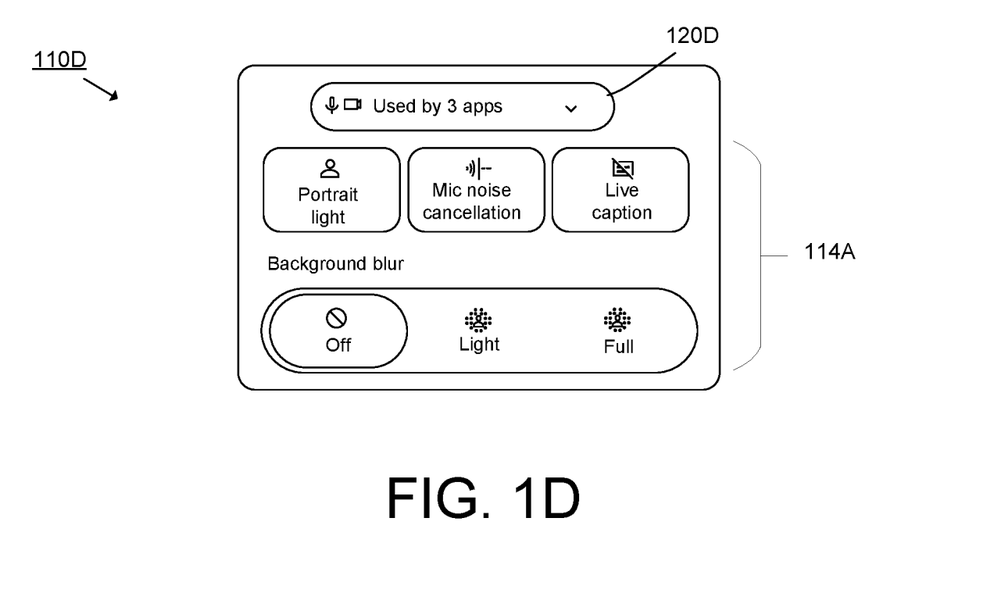
FIG. 1D depicts a media input settings user interface 110, according to an example.

FIGS. 1C-1F depict different examples of media input settings user interface 110, according to examples. FIGS. 1C and 1D depict media input settings user interface 110C and 110D with controls 114A for modifying a media input resource setting. In the example, controls 114A include a lighting control 115, a noise cancellation control 116, a live caption control 117, and a background blur control 118. Media input settings user interface 110D may be used when the media input resource includes a microphone and a camera.

Figure 1E:
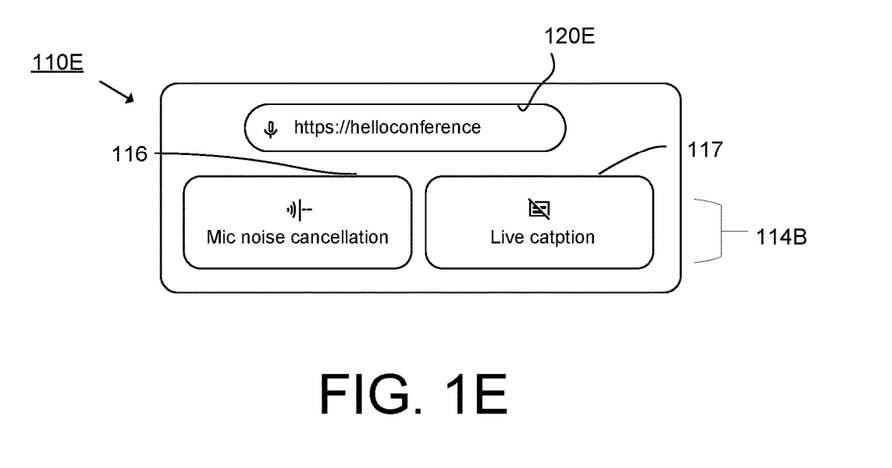
FIG. 1E depicts a media input settings user interface 110, according to an example.

FIG. 1E depicts media input settings user interface 110E with controls 114B. In the example, controls 114B includes a smaller subset of controls directed to microphones, including noise cancellation control 116 and live caption control 117. Media input settings user interface 110E may be used when the media input resource is a microphone.

Figure 1F:
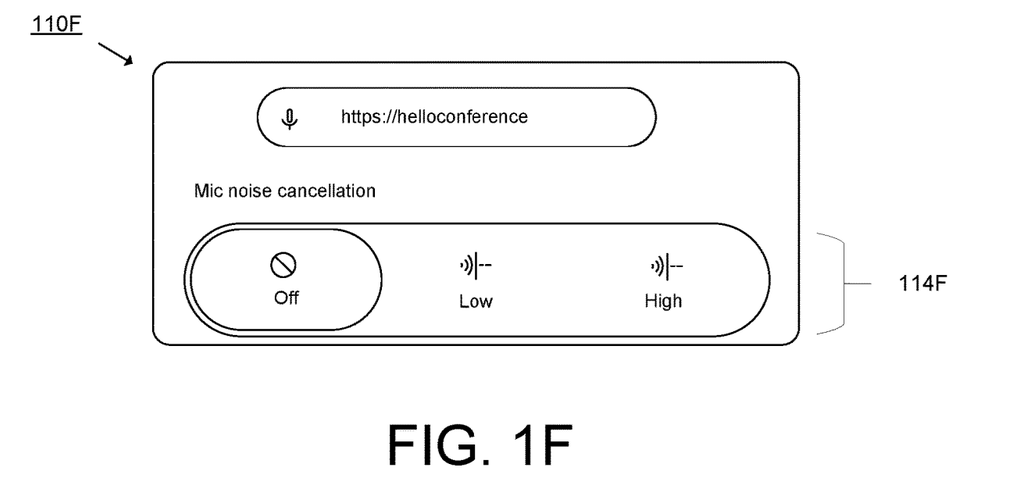
FIG. 1F depicts a media input settings user interface 110, according to an example.

FIG. 1F depicts media input settings user interface 110F with controls 114F. In the example, controls 114F includes a smaller subset of controls directed to microphones. Media input settings user interface 110F may be used when the media input resource is a microphone and no live captioning capabilities are offered.

Figure 1G:
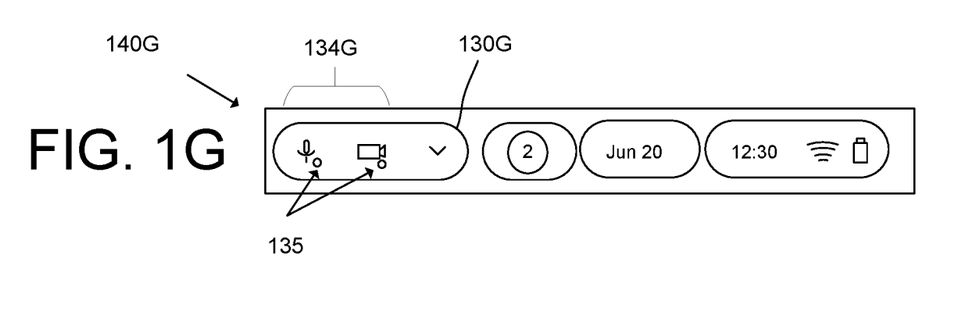
FIG. 1G depicts a minimized settings user interface, according to an example.
Figure 1H:
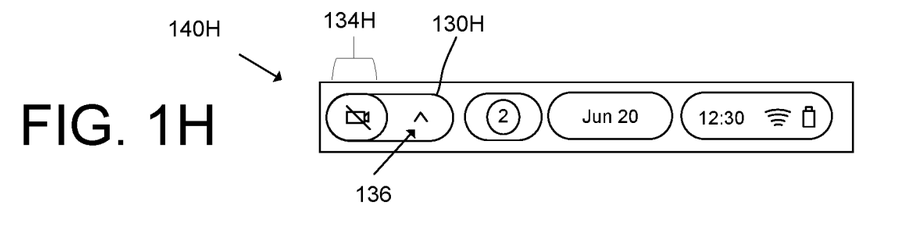
FIG. 1H depicts a minimized settings user interface, according to an example.
Figure 1I:
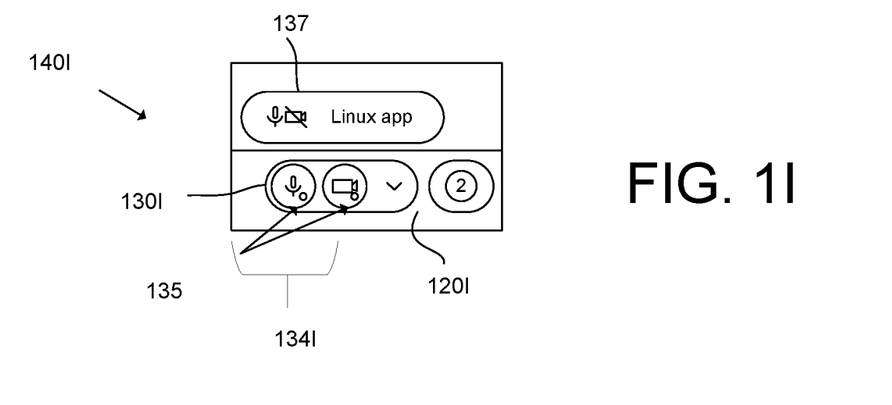
FIG. 1I depicts a minimized settings user interface, according to an example.
Figure 1J:
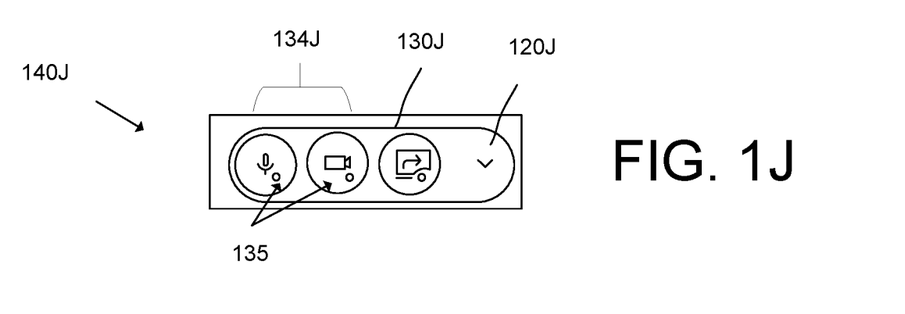
FIG. 1J depicts a minimized settings user interface, according to an example.

FIGS. 1G-1J depict different versions of media input settings user interface 130 in a minimized state, according to examples. FIG. 1G depicts taskbar portion 140G, FIG. 1H depicts taskbar portion 140H, FIG. 1I depicts taskbar portion 140I, and FIG. 1J depicts taskbar portion 140J. As may be seen in the example taskbar 140 of FIG. 1B, taskbar 140 is an area of a desktop maintained by the operating system that cannot be covered by any user interface elements of an application. In the examples of FIGS. 1G-1J, the taskbars are positioned along a lower rectangular surface area of a screen with the longest axis in the horizontal direction. Other orientations of a taskbar are possible, however.

Each of the taskbar portions of FIGS. 1G-1J include a respective instance of media input settings user interface 130 in a minimized state and controls 134: taskbar portion 140G includes media input settings user interface 130G and controls 134G, taskbar portion 140H includes media input settings user interface 130H and controls 134H, taskbar portion 140I includes media input settings user interface 130I and controls 134I, and taskbar portion 140J includes media input settings user interface 130J and controls 134J. By a minimized state, what is meant is that media input settings user interfaces 130G, 130H, 130I, and 130J may display only a subset of the media input resource settings managed by the operating system, or only a subset of the media input resource settings that are displayed in the maximized state of media input settings user interface 110, 110C, 119D, 110E, and 110F, for example.

In examples, controls 134 may function as indicators for whether a media input resource has been accessed by one or more applications. In examples, controls 134 may act as buttons that allow a user to mute and unmute a microphone or turn a camera on or off. In examples, toggling controls 134 may effectively turn on and off the feed from a media input resource.

In examples, the appearance of one or more controls 134 in media input settings user interface 130 may provide an indication that one or more application processes managed by operating system 250 have requested access to the media input resource. In the example of controls 134G, 134I, and 134J each include a microphone icon and a camera icon. The microphone and camera icons indicate that at least one application executing on operating system 250 has accessed the microphone and the camera. The example of media input settings user interface 130H only includes a camera icon, however, along with an expanding indicator 136. Expanding indicator 136 may be used to provide a popup UI that includes further controls that could not fit into media input settings user interface 130H due to space restrictions, possibly due to a crowded taskbar portion 140H. In examples, controls 134 may include only one of the camera or microphone icons, however, indicating that only one of these media input resources is being accessed. In examples, controls 134 may include multiple camera or microphone icons indicating that multiples of these media input resources are in use.

In examples, controls 134 may further include one or more indicators depicting whether a media input resource is in use. For example, controls 134G, 134I, and 134J may include one or more instances of on/off indicator 135. On/off indicator 135 may be an indicator positioned adjacent to an individual control depicted in a media input settings user interface indicating whether the media input resource associated with that control is currently on and receiving input, on/off indicator 135 may indicate whether an associated media input resource is on via color, for example green for on or red for off. In further examples, on/off indicator 135 may indicate whether an associated media input resource is on via any other method.

In examples, media input settings user interface 130 may use other methods to indicate whether a media input resource is in use or not. For example, media input settings user interface 130H includes controls 134H with a camera icon crossed out. This may indicate that a camera has been accessed by an application but is not currently in use.

In examples, media input settings user interface 130 may provide an expanded view user interface when a user hovers a cursor over the area where media input settings user interface 130 is displayed. For example, FIG. 1I depicts expanded view user interface 137 when a cursor hovers over media input settings user interface 130I. Expanded view user interface 137 provides a full view of all the controls available via media input settings user interface 130I.

Figure 1K:
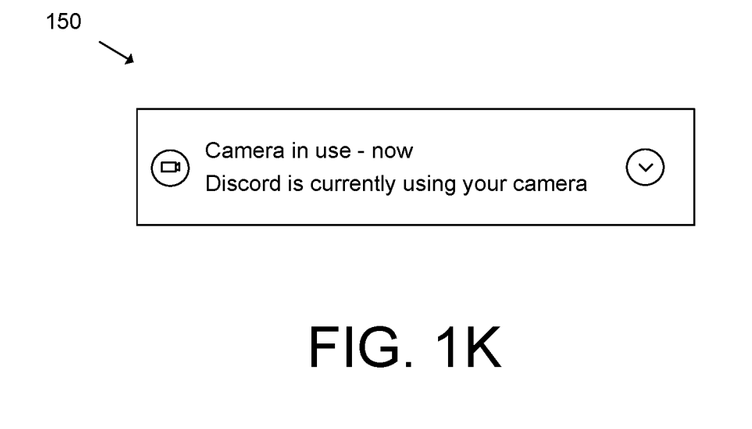
FIG. 1K depicts privacy message user interface 150, according to an example.

In examples, operating system 250 may display one or more privacy messaging user interfaces. For example, FIG. 1K depicts privacy message user interface 150. Privacy message user interface 150 may include messages informing the user whether a media input resource is on or off, in use, and what application it is accessing the media input resource. In examples, privacy message user interface 150 may provide an additional informative message that may be used along with or instead of media input settings user interface 130.

Figure 1L:
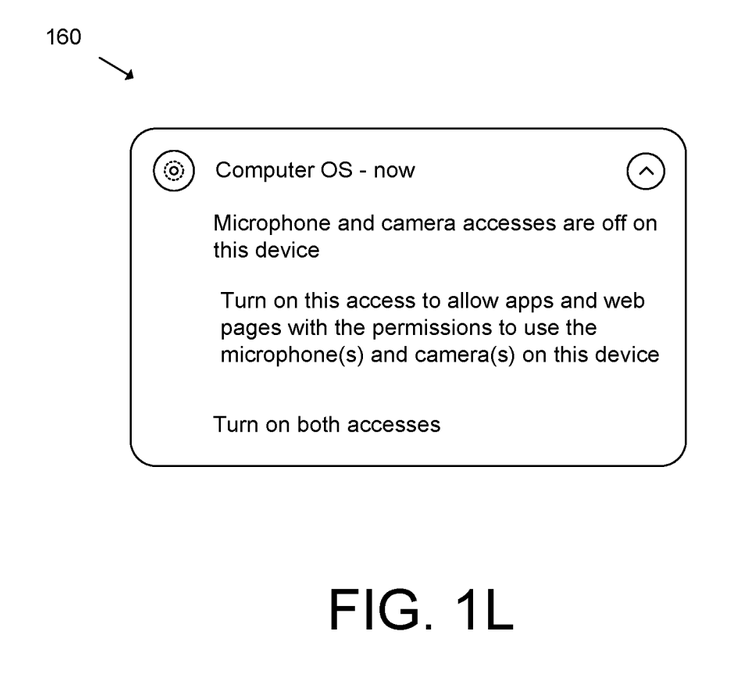
FIG. 1L depicts information window 160, according to an example.

In examples, operating system 250 may display one or more informational messages about the settings. For example, FIG. 1L depicts information window 160. Upon determining that a user is accessing application 270, operating system 250 may display information window 160 to inform the user that one or more of the media input resources are turned off at the operating system via media input resource setting 255.

In examples, settings user interface display module 254 may display media input settings user interface 130 for a predetermined amount of time, for example, 15 seconds. In further examples, however, settings user interface display module 254 may display media input settings user interface 130 as long as a media input resource is in use, or as long as an application accessing a media input resource, is in use.

Operating system 250 may include a media output change module 256. Media output change module 256 is operable to modify transmission of a media output to the application based on the media input resource setting 255.

The transmission is data sent from the operating system to the application. Media output change module 256 may modify that transmission by modifying, stopping, or starting the sending of data to application 270.

Figure 3:
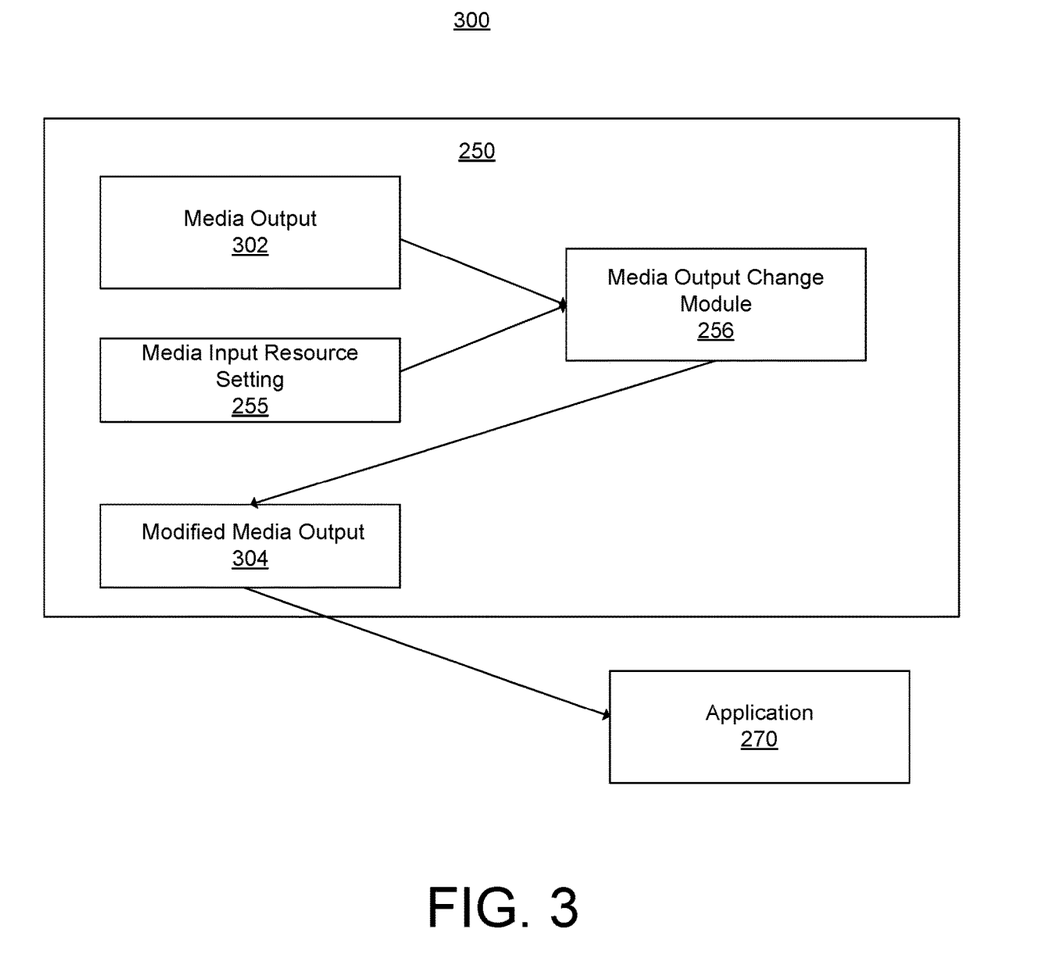
FIG. 3 depicts a flowchart 300, in accordance with an example.

For example, FIG. 3 depicts flowchart 300, in accordance with an example. Flowchart 300 depicts the flow of data from a media input resource to an application on computing device 202.

Flowchart 300 begins with media output 302. And media input resource setting 255. In examples, media output 302 may be received from a media input resource by operating system 250 and media input resource setting 255 may be configured by a user via media input settings user interface 130. In some examples, media output 302 may include raw image, sound, or video data from the media input resource.

Media output 302 and media input resource setting 255 are received at media output change module 256. Media output change module 256 may modify media output 302 based on media input resource setting 255 to generate modified media output 304. For example, media output 302 may be modified to incorporate the user-requested settings selected via lighting control 115, live caption control 117, or background blur control 118. Similarly, a microphone output may be modified via noise cancellation control 116.

In examples, media input settings user interface 130 may include at least one of an audio mute/unmute control or a display on/off control. For example, media input settings user interface 130G, 130H, 130I, and 130J each depict an example of controls that include one or more of an audio mute/unmute control or a display on/off control.

In examples, a block/allow output setting may be set by the audio mute/unmute control or the display on/off control. The block/allow setting may determine how the operating system controls the media output received from the media source. A block output setting may prevent transmission of the media output to the application, while an allow output setting may enable transmission of the media output to the application.

In examples, upon receiving a user selection of a block/allow output setting, an on/off indicator may be displayed on the settings user interface to represent to the user whether the media input resource associated with the block/allow output setting is in use. For example, FIGS. 1G, 1I, and 1J depict on/off indicator 135 and FIG. 1H depicts a camera icon crossed out, which may indicate that the camera is not in use.

Operating system 250 may include return-to-application module 258. Upon receiving a selection of the return-to-application control 120B, 120D, or 120E, application module 258 may give focus to an application user interface associated with the application.

In examples, return-to-application module 258 may return focus to application user interface 102B by executing a context switch to a process associated with application 270.

In examples, media input settings user interface 130 may display the return-to-application control 120B. For example, if a user makes application 270 active on a desktop and media input settings user interface 130 surfaces, a user may change one or more of controls 134 therein. The user may then use return-to-application control 120B to make application 270 active again, thereby bringing application user interface 102B to the foreground again.

Returning to example scenario 100B of FIG. 1B, return-to-application control 120B includes text indicating which application is accessing the media input resource. The example application of scenario 100B is a web-based video conferencing application, therefore that text includes part of a URL. In examples, however, return-to-application control 120B may include a logo associated with application 270, the name of application 270, or any other desired indicator.

In examples, a return-to-application control may offer a choice to return to more than one application accessing a media input resource. For example, return-to-application control 120D of media input settings user interface 110D includes a drop-down menu (indicated by a downward arrow) and is accompanied by text that reads, "Used by 3 apps". Return-to-application controls 120I and 120J of media input settings user interfaces 130I and 130J may also include a drop-down arrow to indicate that there is one application, or in some examples more than one application, to select from. When a user selects one of the applications selectable via return-to-application control 120B, 120D, 120E, 120I, or 120J, for example from a drop-down menu list, this may trigger return-to-application module 258.

In examples, the one or more applications may be stored or tracked in media input resource access list 260. In examples, operating system 250 may add the application to a media input resource access list upon determining that application 270 is accessing the media input resource. The applications offered in the return-to-application control 120B, 120D, 120E, 120I, or 120J may be based on the media input resource access list 260.

In examples, media input resource access list 260 may include an application process identifier identifying an application. Media input resource access list 260 may further include a media input resource type indicating a type of media resource type accessed by the application. The media input resource type may include codes for whether the media input resource is a camera or a microphone, a brand or model of camera or microphone, etc.

In examples, application control 120B may further include one or more icons indicating that one or more media input resources are being accessed by an application. For example, application control 120B includes a microphone icon and a camera icon, indicating that application 270 has accessed both a microphone and camera media input resource. Returning to FIG. 1E, it may be seen that example application control 120E only includes a microphone icon, however, because application 270 in that example has only accessed a microphone and not a camera.

Returning to FIG. 3, application 270 may receive modified media output 304. Application 270 may display or play modified media output 304 on computing device 202. In examples, application 270 may send modified media output 304 to a server or another user device.

In examples, operating system 250 may send a message to application 270 when media input resource setting 255 is changed via settings user interface display module 254. In examples, application 270 may use the message, which may include media input resource setting 255, to generate in-app displays about settings for the user. In examples, application 270 may use the message to modify in-app media input resource settings in turn.

Figure 4:
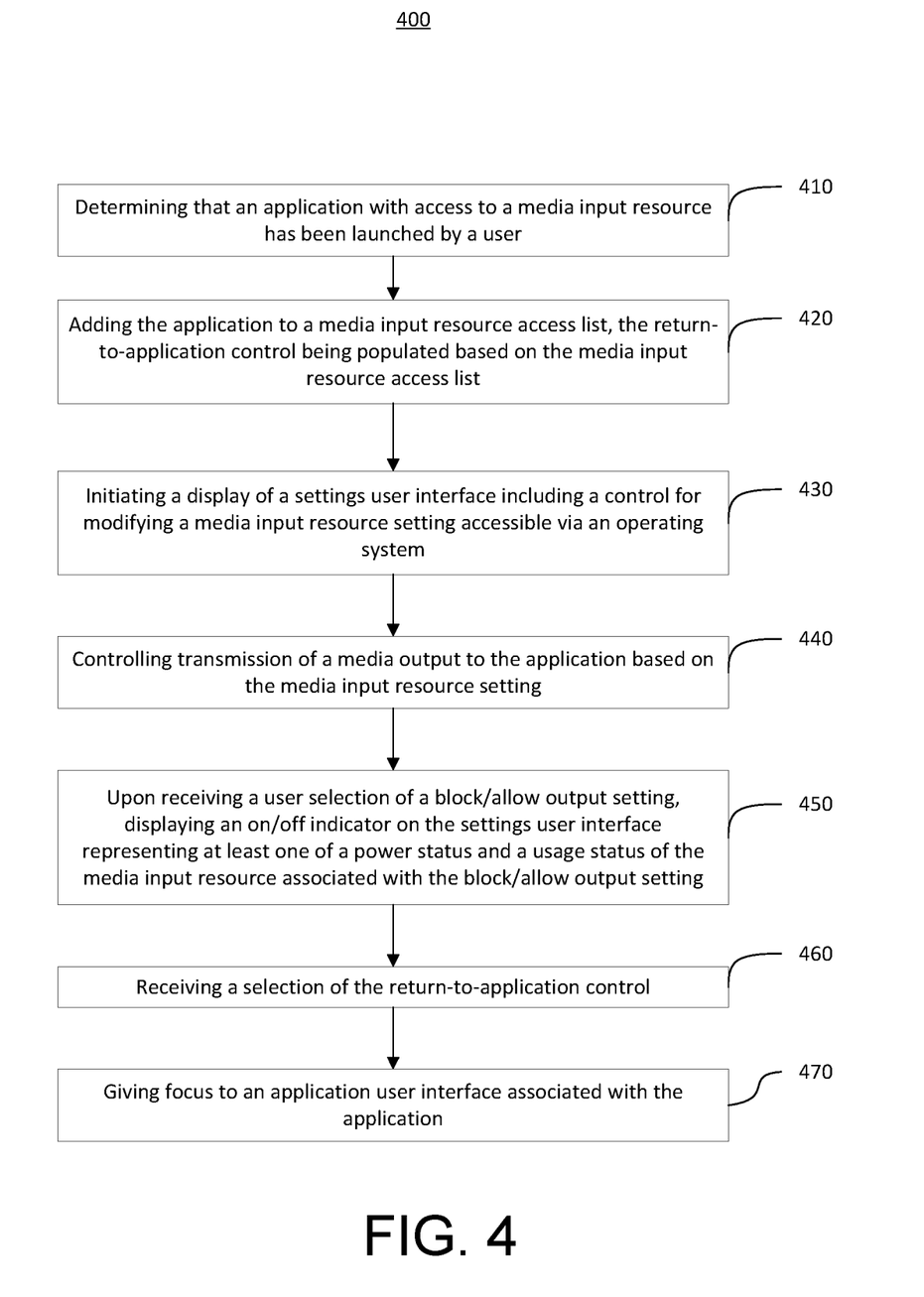
FIG. 4 depicts a flowchart 400, in accordance with an example.

FIG. 4 depicts a flowchart 400 in accordance with an example. Flowchart 400 depicts a method for displaying a media input settings user interface and/or returning to application after displaying the media input settings user interface. In examples, the method may include any combination of steps 410 to 470.

At step 410, it may be determined that an application with access to a media input resource has been launched by a user. For example, it may be determined that an application is accessing a media input resource via application launched determination module 252.

At step 420, the application may be added to a media input resource access list, the return-to-application control being populated based on the media input resource access list. For example, the application may be added to media input resource access list 260.

At step 430, a display of a settings user interface may be initiated including a control for modifying a media input resource setting accessible via an operating system. For example, settings user interface display module 254 may be executed.

At step 440, transmission of a media output to the application may be controlled based on the media input resource setting.

At step 450, upon receiving a user selection of a block/allow output setting, an on/off indicator may be displayed on the settings user interface representing at least one of a power status and a usage status of the media input resource associated with the block/allow output setting. For example, on/off indicator 135 may be displayed.

At step 460, a selection of the return-to-application control may be received. For example, the operating system may receive notification that a user has selected return-to-application control 120B, 120D, 120E, 120I, or 120J.

At step 470, focus may be given to an application user interface associated with the application.

In examples, a system may be provided comprising a means for triggering a media input settings user interface, by an operating system, a means for displaying a media input settings user interface with a media input resource setting, and a means for applying the media input resource setting to transmission to application output.

In examples, a system may be provided comprising a means for displaying a media input settings user interface with a media input resource setting, a means for receiving a return-to-application control, and a means to return the user to the application.

The methods described herein may allow for a centralization of settings for a media input resource across multiple applications via a central interface.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for the purposes of describing example implementations. Example implementations, however, have many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

The terminology used herein is for the purpose of describing particular implementations only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), Graphics Processing Units (GPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

Clause 1. A method performed by an operating system, the method comprising: determining that an application with access to a media input resource has been launched by a user; in response to determining that the application is launched, initiating a display of a settings user interface including a control for modifying a media input resource setting accessible via the operating system; and controlling transmission of a media output to the application based on the media input resource setting.

Clause 2. The method of clause 1, wherein the settings user interface further includes a return-to-application control, the method further comprising: receiving a selection of the return-to-application control; and in response to receiving the selection of the return-to-application control, giving focus to an application user interface associated with the application.

Clause 3. The method of clause 2, wherein the application is a first application executing on the operating system and the selection of the return-to-application control includes the first application and a second application executing on the operating system, the second application having access to the media input resource.

Clause 4. The method of clause 2 or clause 3, further comprising: upon determining that the application is accessing the media input resource, adding the application to a media input resource access list, the return-to-application control being populated based on the media input resource access list.

Clause 5. The method of any of clause 1 to clause 4, where controlling the transmission of the media output based on the media input resource setting further comprises: modifying the media output prior to transmitting the media output to the application.

Clause 6. The method of any of clause 1 to clause 5, wherein the media input resource setting includes at least one of an audio mute/unmute control or a display on/off control.

Clause 7. The method of clause 6, further comprising: upon receiving a user selection of a block/allow output setting, displaying an on/off indicator on the settings user interface representing at least one of a power status and a usage status of the media input resource associated with the block/allow output setting.

Clause 8. The method of any of clause 1, wherein the settings user interface is displayed in a minimized state within an operating system task bar.

Clause 9. The method of clause 1, wherein the settings user interface is displayed in a maximized state that cannot be covered by the application.

Clause 10. A system comprising: a processor; and a memory configured with an operating system configured with instructions to: determine that an application with access to a media input resource has been launched by a user; in response to determining that the application is launched, initiate a display of a settings user interface including a control for modifying a media input resource setting accessible via the operating system; and control transmission of a media output to the application based on the media input resource setting.

Clause 11. The system of clause 10, wherein the settings user interface further includes a return-to-application control, the operating system further configured with instructions to: receive a selection of the return-to-application control; and in response to receiving the selection of the return-to-application control, give focus to an application user interface associated with the application.

Clause 12. The system of clause 11, where the application is a first application executing on the operating system and the selection of the return-to-application control includes the first application and a second application executing on the operating system, the second application having access to the media input resource.

Clause 13. The system of clause 11 or clause 12, the operating system further configured with instructions to: upon determining that the application is accessing the media input resource, add the application to a media input resource access list, the return-to-application control being populated based on the media input resource access list.

Clause 14. The system of any of clause 10 to clause 13, wherein controlling the transmission of the media output based on the media input resource setting further comprises modifying the media output prior to transmitting the media output to the application.

Clause 15. The system of any of clause 10 to 14, wherein the media input resource setting includes at least one of an audio mute/unmute control or a display on/off control.

Clause 16. The system of clause 15, the operating system further configured with instructions to: upon receiving a user selection of a block/allow output setting, display an on/off indicator on the settings user interface representing at least one of a power status and a usage status of the media input resource associated with the block/allow output setting.

Clause 17. The system of clause 10, wherein the settings user interface is displayed in a minimized state within an operating system task bar.

Clause 18. The system of clause 10, wherein the settings user interface is displayed in a maximized state that cannot be covered by the application.

Clause 19. A method performed by an operating system, the method comprising: initiating a display of a settings user interface for a media input resource, the settings user interface including: a control for modifying a media input resource setting, and a return-to-application control identifying at least an application having access to the media input resource; receiving a selection of the return-to-application control; and in response to receiving the selection of the return-to-application control, giving focus to an application user interface associated with the application.

Clause 20. The method of clause 19, wherein the application is a first application executing on the operating system and the return-to-application control identifies the first application and a second application executing on the operating system, the second application having access to the media input resource.

Clause 21. The method of any of clause 19 to clause 20, further comprising: upon determining that the application is accessing the media input resource, adding the application to a media input resource access list, the return-to-application control being populated based on the media input resource access list.

Clause 22. The method of clause 21, wherein the media input resource access list identifies an application process identifier and a media input type being accessed by the application.

Clause 23. The method of any of clause 19 to clause 22, wherein the display of the settings user interface is initiated in response to determining that the application has been launched by a user.

Clause 24. The method of any of clause 19 to clause 23, wherein the media input resource setting includes at least one of an audio mute/unmute control or a display on/off control.

Clause 25. The method of clause 24, further comprising: upon receiving a user selection of a block/allow output setting, displaying an on/off indicator on the settings user interface representing at least one of a power status and a usage status of the media input resource associated with the block/allow output setting.

Clause 26. A system comprising: a processor; and a memory configured with an operating system configured with instructions to: initiate a display of a settings user interface for a media input resource, the settings user interface including: a control for modifying a media input resource setting, and a return-to-application control identifying at least an application having access to the media input resource; receive a selection of the return-to-application control; and in response to receiving the selection of the return-to-application control, give focus to an application user interface associated with the application.

Clause 27. The system of clause 26, wherein the application is a first application executing on the operating system and the return-to-application control identifies the first application and a second application executing on the operating system, the second application having access to the media input resource.

Clause 28. The system of clause 26 or clause 27, the operating system further configured with instructions to: upon determining that the application is accessing the media input resource, add the application to a media input resource access list, the return-to-application control being populated based on the media input resource access list.

Clause 29. The system of clause 28, wherein the media input resource access list identifies an application process identifier and a media input type being accessed by the application.

Clause 30. The system of any of clause 26 to clause 29, wherein the display of the settings user interface is initiated in response to determining that the application has been launched by a user.

Clause 31. The system of any of clause 26 to clause 29, wherein the media input resource setting includes at least one of an audio mute/unmute control or a display on/off control.

Clause 32. The system of clause 31, the operating system further configured with instructions to: upon receiving a user selection of a block/allow output setting, display an on/off indicator on the settings user interface representing at least one of a power status and a usage status of the media input resource associated with the block/allow output setting.

What is claimed is:

1. A method comprising:
   determining that an application is currently accessing a sensor for a media input, the sensor including a microphone or a camera;
   initiating a display of a user interface including a control for modifying a media setting relating to the sensor, the display of the user interface being initiated via an operating system independently of the application;
   generating second media data by modifying first media data received from the sensor based on the media setting; and
   transmitting the second media data to the application.

2. The method of claim 1, wherein the user interface further includes a return-to-application control, the method further comprising:
   receiving a selection of the return-to-application control; and
   in response to receiving the selection of the return-to-application control, giving focus to a user interface associated with the application.

3. The method of claim 2, wherein the return-to-application control is populated based on an access list relating to the sensor.

4. The method of claim 1,
   wherein determining that the application is executing further comprises determining that the application has been added to an access list for the sensor.

5. The method of claim 1, wherein the media setting includes at least one of an audio mute/unmute control or a display on/off control.

6. The method of claim 5, further comprising:
   upon receiving a user selection of a block/allow output setting, displaying an on/off indicator on the user interface representing at least one of a power status and a usage status of the sensor associated with the block/allow output setting.

7. The method of claim 1, wherein the user interface is displayed in a minimized state within an operating system task bar.

8. The method of claim 1, wherein the user interface is displayed in a maximized state that cannot be overlaid by the application.

9. A system comprising:
   a processor; and
   a memory configured with an operating system having instructions to:
     determine that an application is currently accessing a sensor including a microphone or a camera for a media input;
     initiate, via the operating system, a display of a user interface including a control for modifying a media setting, the display of the user interface being initiated via the operating system independently of the application;
     generate second media data by modifying first media data received from the sensor based on the media setting; and
     transmit the second media data to the application.

10. The system of claim 9, wherein the user interface further includes a return-to-application control, the operating system further configured with instructions to:
    receive a selection of the return-to-application control; and
    in response to receiving the selection of the return-to-application control, give focus to a user interface associated with the application.

11. The system of claim 10, wherein the return-to-application control is populated based on an access list for the sensor.

12. The system of claim 9,
    wherein determining that the application is executing further comprises determining that the application has been added to an access list for the sensor.

13. The system of claim 9, wherein the media setting includes at least one of an audio mute/unmute control or a display on/off control.

14. The system of claim 13, the operating system further configured with instructions to:
    upon receiving a user selection of a block/allow output setting, display an on/off indicator on the user interface representing at least one of a power status and a usage status of the sensor associated with the block/allow output setting.

15. The system of claim 9, wherein the user interface is displayed in a minimized state within an operating system task bar.

16. The system of claim 9, wherein the user interface is displayed in a maximized state that cannot be overlaid by the application.

17. A method comprising:
    initiating a display of a user interface for a sensor including a microphone or a camera for a media input, the user interface being associated with an operating system and initiated independently of a first application and a second application that are currently accessing the sensor, the user interface including:
      a control for modifying a media setting relating to the sensor, and
      a return-to-application control expandable to display a first option operable to give focus to a first user interface of the first application in response to selection and a second option operable to give focus to an interface of the second application upon selection;
    receiving a selection of the return-to-application control; and
    in response to determining that the first option is selected, giving focus to a user interface associated with the first application.

18. The method of claim 17, further comprising:
    upon determining that the first application is accessing the sensor, adding the first application to an access list associated with the sensor, the return-to-application control being populated based on the access list.

19. The method of claim 18, wherein the access list identifies an application process identifier and a sensor type being accessed by the first application.

20. The method of claim 17, wherein the display of the user interface is initiated in response to determining that the first application is executing.

21. The method of claim 17, wherein the media setting includes at least one of an audio mute/unmute control or a display on/off control.

22. The method of claim 21, further comprising:
- upon receiving a user selection of a block/allow output setting, displaying an on/off indicator on the user interface representing at least one of a power status and a usage status of the media input associated with the block/allow output setting.

\* \* \* \* \*